(12) United States Patent
Ruffier et al.

(10) Patent No.: US 10,061,319 B2
(45) Date of Patent: Aug. 28, 2018

(54) METHOD AND DEVICE FOR IN-FLIGHT TERRAIN IDENTIFICATION FOR MICRODRONE

(71) Applicants: Universite d'Aix-Marseille, Marseilles (FR); Centre national de la recherche scientifique, Paris (FR)

(72) Inventors: Franck Ruffier, Marseilles (FR); Fabien Expert, Aubagne (FR)

(73) Assignees: UNIVERSITE D'AIX-MARSEILLE, Marseille (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 140 days.

(21) Appl. No.: 15/030,351

(22) PCT Filed: Oct. 16, 2014

(86) PCT No.: PCT/EP2014/072229
§ 371 (c)(1),
(2) Date: Apr. 18, 2016

(87) PCT Pub. No.: WO2015/055769
PCT Pub. Date: Apr. 23, 2015

(65) Prior Publication Data
US 2016/0259337 A1 Sep. 8, 2016

(30) Foreign Application Priority Data

Oct. 18, 2013 (FR) ...................................... 13 60211

(51) Int. Cl.
*G01C 23/00* (2006.01)
*G05D 1/00* (2006.01)
(Continued)

(52) U.S. Cl.
CPC ......... *G05D 1/0094* (2013.01); *B64C 39/024* (2013.01); *G01C 21/20* (2013.01);
(Continued)

(58) Field of Classification Search
CPC .. G05D 1/0094; G05D 1/0607; B64C 39/024; B64C 2201/024; B64C 2201/141;
(Continued)

(56) References Cited

U.S. PATENT DOCUMENTS 4,309,104 A * 1/1982 Prinz ...................... G01C 11/02
356/28
6,480,763 B1 * 11/2002 Lappos ................ G08G 5/0021
340/954

(Continued)

FOREIGN PATENT DOCUMENTS

WO 2004/025386 A1 3/2004

OTHER PUBLICATIONS

Expert et al., "Controlling Docking, Altitude and Speed in a Circular High-Roofed Tunnel Thanks to the Optic Flow", IEEE/RSJ International Conference on Intelligent Robots and Systems, Oct. 7-12, 2012, Vilamoura, Algarve, Portugal, pp. 1125-1132.

(Continued)

*Primary Examiner* — Hussein Elchanti
(74) *Attorney, Agent, or Firm* — Thompson Coburn LLP; Steven M. Ritchey

(57) ABSTRACT

The invention relates to a surface identification device for the movement of a vehicle at a distance from that surface, the device comprising a detection head, the head including at least one sensor of a property depending on the distance of the center of the head from the surface, each sensor covering a detection zone centered on a line of sight, an orientation system for the detection zone of each sensor, and a controller processing the signals from each sensor and (Continued)

controlling the system based on said signals. The controller estimates the direction of the perpendicular to the surface, and uses said system to rotate the line of sight of each sensor in a separate direction by a reorientation angle of the direction of said perpendicular.

19 Claims, 7 Drawing Sheets

(51) Int. Cl.
*B64C 39/02* (2006.01)
*G01F 1/00* (2006.01)
*G08G 5/00* (2006.01)
*G05D 1/06* (2006.01)
*G01C 21/20* (2006.01)

(52) U.S. Cl.
CPC ............... *G01C 23/00* (2013.01); *G01F 1/00* (2013.01); *G05D 1/0607* (2013.01); *G08G 5/0086* (2013.01); *B64C 2201/024* (2013.01); *B64C 2201/108* (2013.01); *B64C 2201/141* (2013.01)

(58) Field of Classification Search
CPC ... B64C 2201/108; G01F 1/00; G08G 5/0086; G01C 21/20; G01C 23/00
See application file for complete search history.

(56) References Cited

U.S. PATENT DOCUMENTS

| | | | |
|---|---|---|---|
| 7,280,134 B1* | 10/2007 | Henderson | B64D 11/0015 348/117 |
| 2004/0173726 A1* | 9/2004 | Mercadal | F16M 11/10 248/660 |
| 2015/0116345 A1* | 4/2015 | Shoup | G01C 23/00 345/594 |
| 2016/0207625 A1* | 7/2016 | Judas | B64C 29/0025 |
| 2016/0376031 A1* | 12/2016 | Michalski | B64F 1/36 701/15 |
| 2016/0378120 A1* | 12/2016 | Creasman | B64C 3/546 701/2 |

OTHER PUBLICATIONS

International Search Report for PCT/EP2014/072229 dated Mar. 9, 2015.
Preliminary Search Report for FR Application 1360211 dated Aug. 4, 2014.
Ruffier et al., "OCTAVE, a Bioinspired Visuo-Motor Control System for the Guidance of Micro-Air-Vehicles", Bioengineered and Bioinspired Systems, Proceedings of SPIE, 2003, pp. 1-12, vol. 5119.

* cited by examiner

METHOD AND DEVICE FOR IN-FLIGHT TERRAIN IDENTIFICATION FOR MICRODRONE

CROSS-REFERENCE TO RELATED APPLICATIONS

This application is a U.S. National Phase application of PCT/EP2014/072229, filed on Oct. 16, 2014, claiming the benefit of FR Application No. 13 60211, filed Oct. 18, 2013, both of which are incorporated herein by reference in their entireties.

The present invention relates to a surface identification device for the autonomous movement of a moving vehicle at a distance from that surface, the surface identification device comprising:

a) a surface detection head defining a coordinate system fixed to the detection head with an origin at the center of the detection head, an axis of advance, a drift axis, an ascent axis, the detection head including at least one sensor for a quantity depending on the distance of the center of the detection head from the surface, each sensor covering a detection zone centered on a line of sight;

b) an orientation system for orienting the detection zone of each sensor by rotating the detection zone around the drift axis; and c) a controller suitable for receiving and processing the signals from each sensor and controlling the system for orienting the detection zone based on said signals.

Such a device is described in the article "Controlling docking, altitude and speed in a circular high-roofed tunnel thanks to the optic flow" published on Oct. 16, 2012 by Fabien Expert and Franck Ruffier in "IEEE International Conference on Intelligent Robots and Systems (IROS), Vilamoura: Portugal". This article is subsequently referred to as the "IROS article".

The IROS article describes a microdrone, i.e., a helicopter with two rotors, comprising a main body, to which a terrain detection head is attached provided with a "composite eye". The composite eye is made up of four optical flow sensors distributed on the detection head. The detection head is capable of turning relative to the main body owing to a stepping motor. When the microdrone is in flight, the angle of the detection head relative to the main body is controlled such that the orientation of the detection head remains the same in the land reference and compensates the angle of the main body in the land reference.

It turns out that the autonomous navigation system of this known microdrone is not always capable of avoiding all of the obstacles in a cluttered environment and/or in the presence of moving obstacles.

FIG. 1 of document WO 2004/027434 A1 shows a helicopter stabilization system 1 comprising a nacelle 5 with an optical sensor 3 and rotation sensors 9 and 10. The nacelle 5 is stationary relative to the helicopter 1. This known system is complex and very sensitive to vibrations.

One aim of the present invention is to produce an improved autopilot for a drone, microdrone or nanodrone in order to allow the drone, microdrone or nanodrone to better navigate in a steep and/or moving environment.

Another aim of the present invention is to produce an autopilot for a microdrone or nanodrone with no inertial unit. Indeed, an inertial unit can only be placed onboard a microdrone or nanodrone with difficulty, due to its size, weight, and computing power needs.

According to the invention, these aims are achieved by a device as defined above, characterized in that the controller is configured for estimating the direction of the perpendicular to the surface in said coordinate system based on said signals, and for using said orientation system to rotate the line of sight of the viewing zone of each sensor into a direction separated by a determined reorientation angle from the direction of said perpendicular.

By reorienting the line of sight of the detection zone of the sensor at a determined reorientation angle relative to the direction of the perpendicular to the surface, the surface identification device according to the invention makes it possible to measure a property depending on a more precise distance from the surrounding objects. The vehicle can thus move without problems while avoiding any obstacles that it may detect in advance, for example by orienting the line of sight toward the movement direction in the presence of a sloped obstacle.

According to preferred embodiments, the device according to the invention comprises one, several or all of the following features, in any technically possible combination(s):

the reorientation angle is comprised between 0 and 90°;

each sensor is an optical flow sensor, and the controller is configured for estimating the direction of the perpendicular to the surface by determining the maximum optical flow direction based on the signals delivered by each optical flow sensor;

the controller is configured for determining the maximum optical flow direction by carrying out the following steps:

a) determining the function of the optical flow from the orientation of the line of sight of the detection zone in said coordinate system by regression analysis of the optical flow signals provided by each optical flow sensor, in particular by the least squares method; and b) determining, preferably by differentiation of said function, the orientation of the line of sight of the detection zone for which said function has a maximum;

the controller is further configured for computing a confidence index based on said signals, and validating or rejecting the estimate of the direction of the perpendicular to the surface based on the value of the confidence index;

the detection head comprises four optical flow sensors, i.e., a front ventral sensor, a rear ventral sensor, a front dorsal sensor, and a rear dorsal sensor;

the detection zone orientation system comprises an actuator, in particular a stepping motor, able to rotate the surface detection head around the drift axis;

an optical flow measuring assembly comprising a matrix of photodetectors covering a detection field of substantially 360°×60° around the drift axis, and the orientation system of the detection zone is able to select one or more subsets of said photodetectors to represent each of said sensors;

the detection head is further equipped with at least one gyro-stabilization sensor of the detection head to compensate the rotational movements of said moving vehicle during flight.

The invention also relates to an aerial microdrone with autonomous movement comprising a device as defined above, the controller being configured for controlling the actuator so as to align the axis of ascent of the detection head in the estimated direction of the perpendicular to the surface and thus to keep the axis of advance of the detection head parallel to the local slope of the surface overflown by the microdrone.

Preferably, the microdrone further comprises a gyrometer and/or an airspeed indicator for controlling the linear advance speed of the microdrone.

According to the invention, the above aims are also achieved by a surface identification method during a movement at a distance from said surface, the method being characterized by the following steps:

a) providing a detection zone centered on a line of sight;
b) measuring a quantity depending on said distance from the surface in the provided detection zone;
c) estimating the direction of the perpendicular to the surface and thus the minimum distance direction from the surface based on the measured quantity;
d) reorienting the line of sight from the detection zone in a direction separated by a determined reorientation angle γ from the direction of said perpendicular.

According to preferred embodiments, the method according to the invention comprises one, several or all of the following features, in any technically possible combination(s):

step b) consists of measuring the optical flow, and step c) comprises:
 i) determining the function of the optical flow of the orientation of the line of sight of the detection zone by regression analysis of the optical flow measurements, in particular by the least squares method; and
 ii) determining, preferably by differentiation of said function, the orientation of the line of sight of the detection zone for which said function has a maximum;
the method is executed with the device as defined above or with the microdrone as defined above.

The invention will be better understood upon reading the following detailed description, done in reference to the appended drawings, in which.

Figure 4:
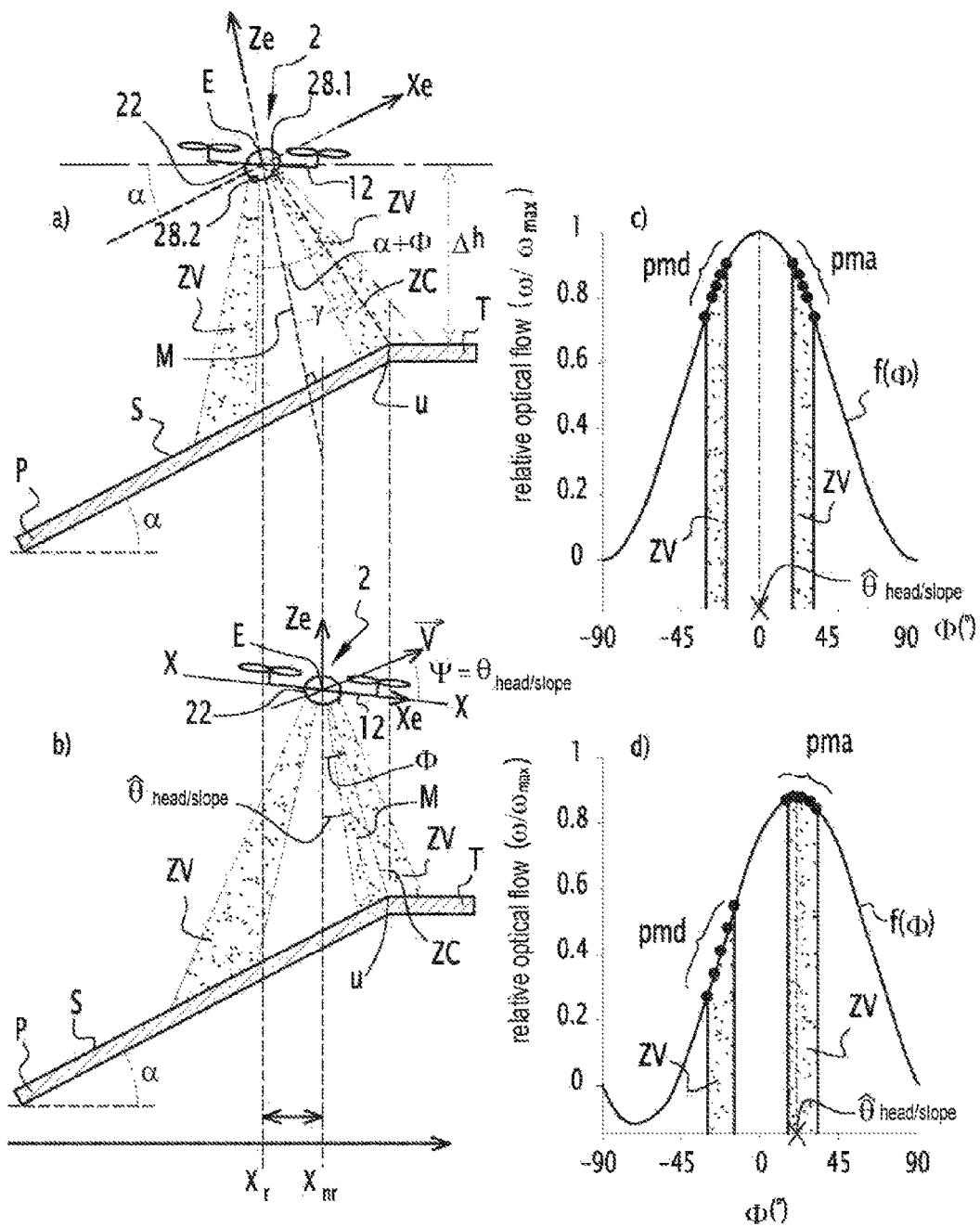
Figure 5:
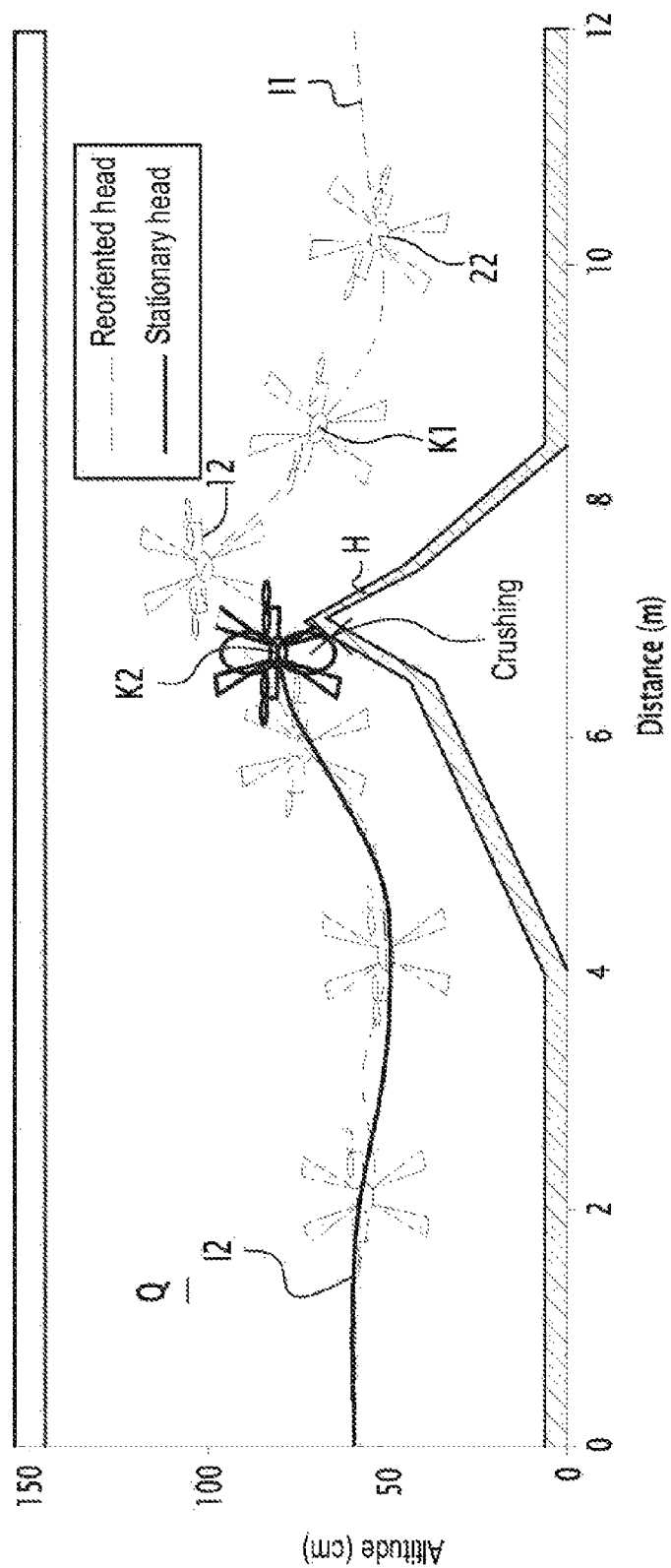
Figure 6:
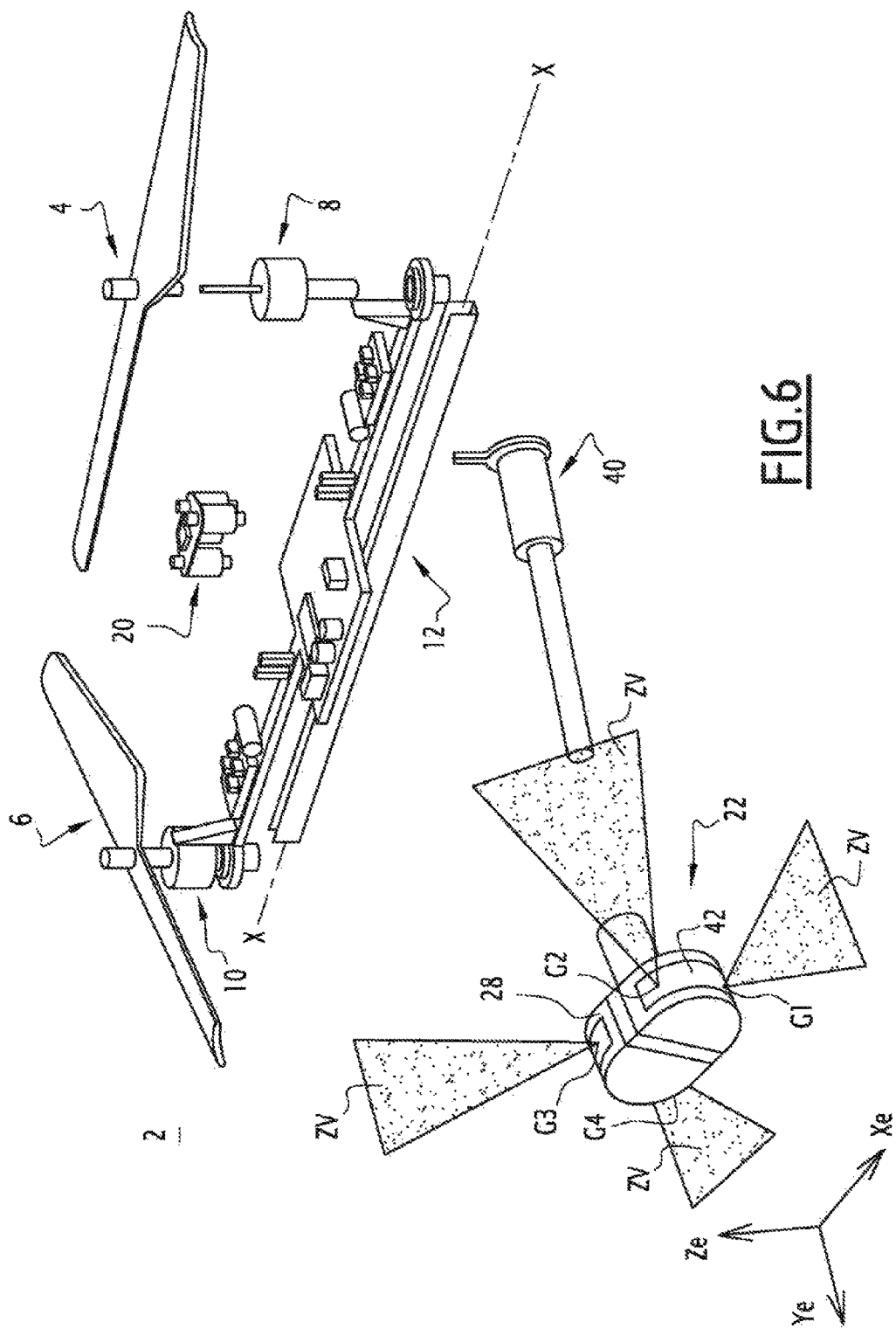
Figure 7:
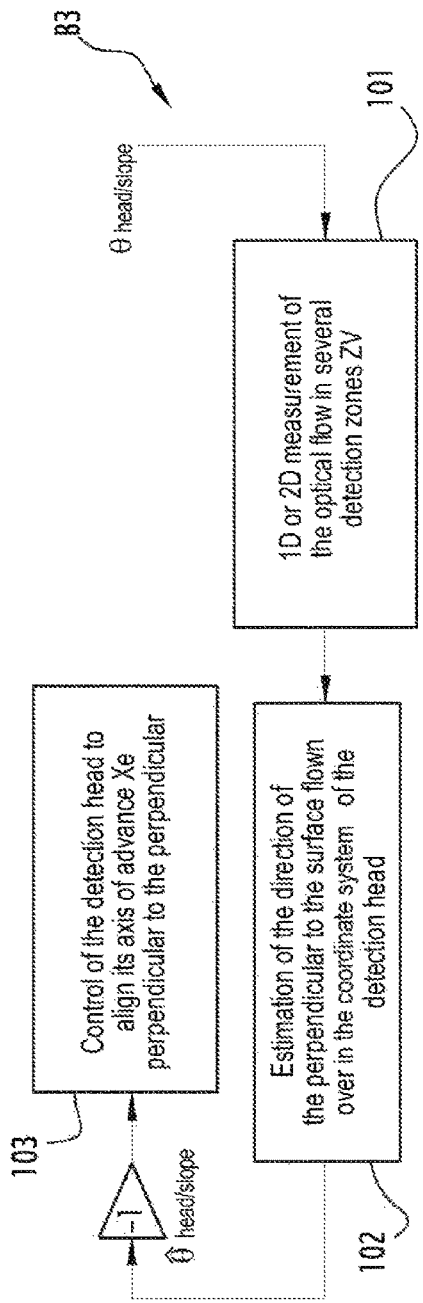
Figure 8:
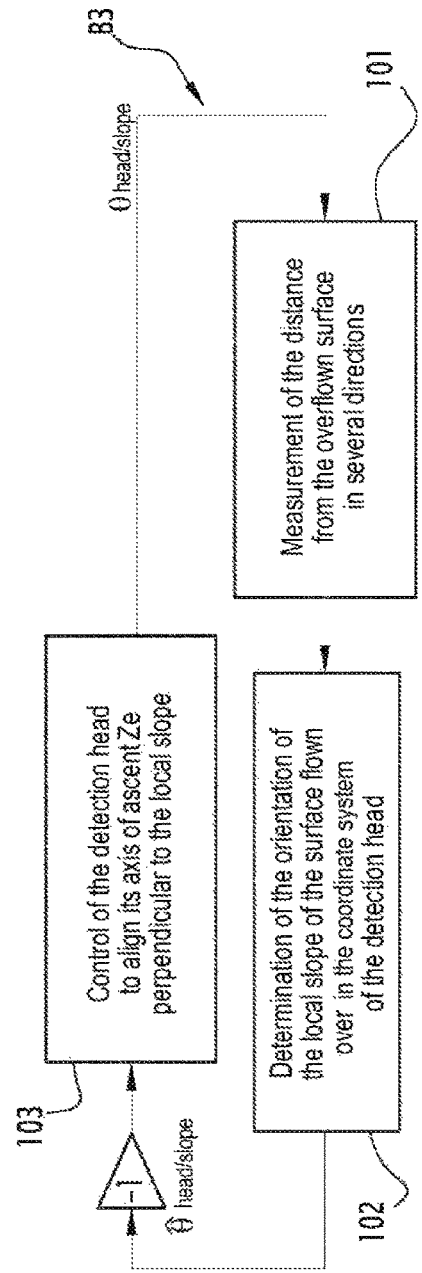

FIGS. 4a) and b) illustrate the improvement of the obstacle detection according to the invention;

FIGS. 4c) and d) show the evolution of the optical flow as a function of the orientation of the line of sight of the detection zone of an optical flow sensor, and the optical flow measurement points obtained by the set of ventral local movement sensors included in an optical flow sensor;

FIG. 5 shows the behavior of a traditional microdrone with a stationary detection head relative to its main body and a microdrone according to the invention across from a sloped relief;

FIG. 6 is a simplified perspective view of a microdrone of the helicopter type according to a second example embodiment of the invention; and FIGS. 7 and 8 illustrate two preferred alternatives of the feedback loop according to the invention controlling the orientation of the detection head of the microdrone.

GENERAL CONSIDERATIONS

The present invention preferably applies to flying large drones, microdrones and nanodrones equipped with optical flow sensors. Nevertheless, the invention is not limited to this. It can advantageously applied to other vehicles moving at a distance from the surface, such as a robotic fish, a space vessel, etc.

Aside from optical flow sensors, distance sensors such as ultrasound sensors, laser sensors, radar sensors, sonar sensors, etc., or sensors measuring a property depending on distance such as a sensor based on the electrical direction, can also be used in the context of the invention.

First Embodiment

Figure 1:
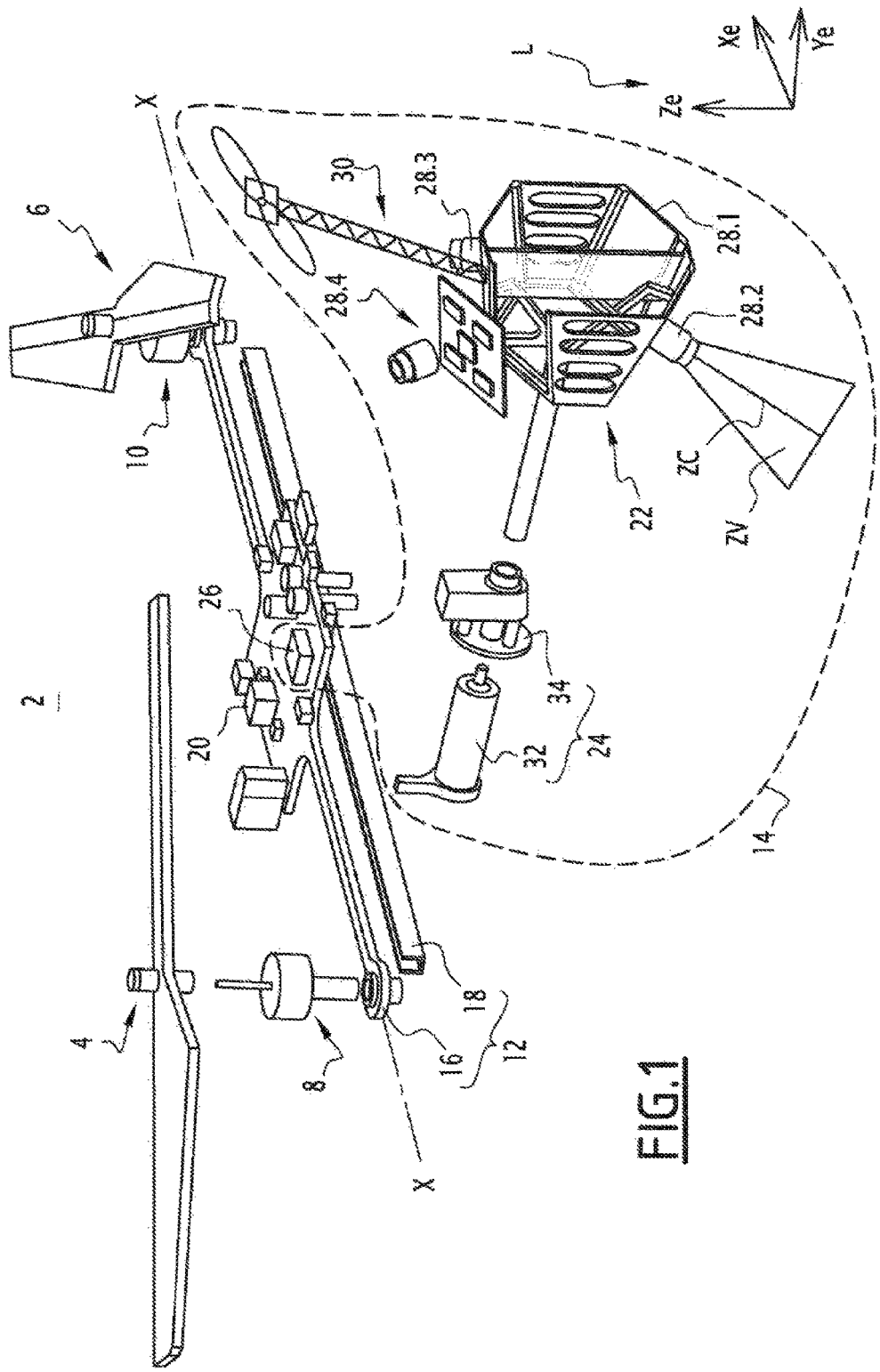
FIG. 1 is a simplified perspective view of a microdrone of the helicopter type according to a first example embodiment of the invention.

FIG. 1 shows a microdrone 2 according to the invention. This microdrone, weighing approximately 80 g, is a helicopter with two rotors 4, 6 with a span of approximately 50 cm. The microdrone 2 is capable of flying autonomously by controlling its linear advance speed and altitude based on optical flow measurements. It can in particular follow a ground and a ceiling, and can land. It has the particularity of being able to navigate without measurements in the inertial land reference.

Microdrones or nanodrones of this type are applicable in search, reconnaissance or rescue missions, in particular when the relief is steep or in a setting with buildings and/or when GPS navigation is not possible or desirable.

In addition to the two rotors 4, 6, the microdrone 2 includes two electric motors 8, 10 for driving the rotors, a main body 12, and a land identification device 14. The main body 12 defines a longitudinal axis X-X. It includes a printed circuit 16 and a reinforcing bar 18 of the printed circuit 16, preferably made from carbon fibers. The reinforcing bar 18 preferably has a length of about 25 cm. Preferably, a gyrometer 20 measuring the pitch speed of the microdrone 2 is positioned on the printed circuit 16.

The land identification device 14 is defined in FIG. 1 by dotted lines. It comprises a terrain detection head 22, a detection zone orientation system 24 and a controller 26 controlling the microdrone 2.

The terrain detection head 22 defines a local coordinate system L connected to the detection head, preferably orthonormal, with an origin E (cf. FIG. 2) at the center of the detection head 22, an axis of advance Xe, a drift axis Ye, and an ascent axis Ze.

Figure 2:
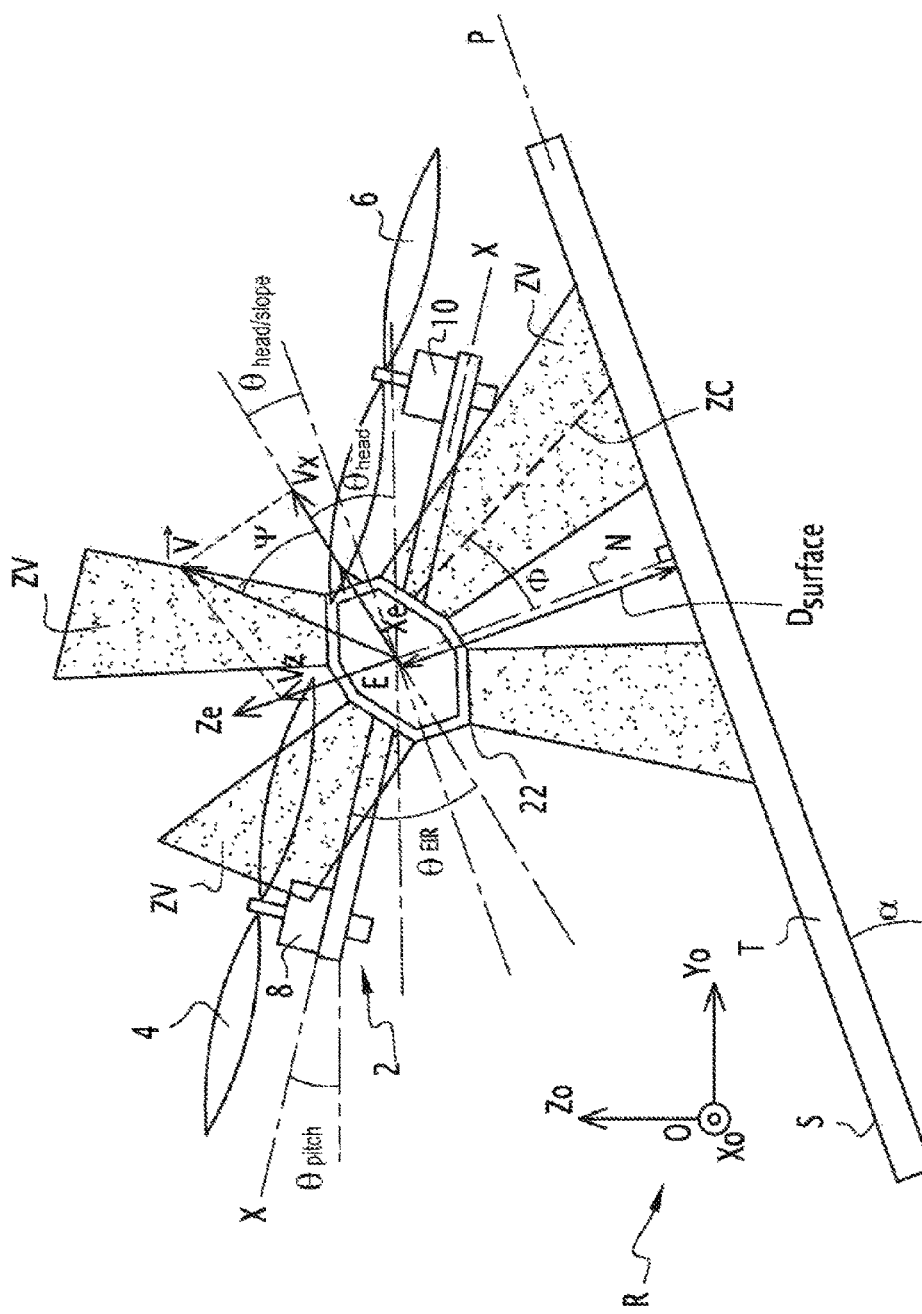
FIG. 2 is a diagram illustrating the coordinate systems and quantities used in the invention.

In the example illustrated in FIGS. 1 and 2, the detection head 22 is provided with four optical flow sensors 28 distributed thereon. One can see a front ventral sensor 28.1 able to measure a front ventral optical flow $\omega_{va}$, a rear ventral sensor 28.2 able to measure a rear ventral optical flow $\omega_{vd}$, a front dorsal sensor 28.3 able to measure a front dorsal optical flow $\omega_{da}$, and a rear dorsal sensor 28.4 able to measure a rear dorsal optical flow $\omega_{dd}$. Each optical flow sensor 28 covers a detection zone ZV centered on a line of sight ZC. Each optical flow sensor 28 preferably comprises a set of five local movement sensors separated by a known angle.

It will be noted that the detection head 22 can also have lateral optical flow sensors.

In one alternative, the detection head 22 also has an airspeed indicator 30 measuring the airspeed during flight. Furthermore, the detection head 22 can be equipped with gyro-stabilization sensors, such as GPS sensors or gyrometers. These sensors make it possible to take the frequent tilting movements of the microdrone 2 during flight into account, and thus to improve the measurements of the optical flow sensors 28.

In another alternative, the detection head 22 can have optical flow sensors with a camera having a small field of view or at a very large angle. The optical flow sensors can also comprise a combination of a camera and a mirror in order to create a panoramic viewing field.

In the embodiment according to FIG. 1, the system 24 for orienting the detection zone ZV comprises a motor 32, preferably a stepping motor, combined with a reducing gear 34. The motor 32 makes it possible to rotate the detection head 22 around the drift axis Ye, and thus to modify the detection zone ZV of the optical flow sensors 28.

The controller 26 is a microcontroller positioned on the printed circuit 16.

In reference to FIG. 2, we will now identify the geometric quantities used in the context of the invention. FIG. 2 shows the microdrone 2 in flight above a terrain T with local slope P and surface S.

It will be noted that, in the context of the invention, the term "terrain" refers to any type of relief or interface that the microdrone is called upon to follow during flight. It may in particular involve a ground, a ceiling, the surface of an expanse of water, a wall, a seabed, etc.

Reference R denotes a land inertial reference with origin O and three axes Xo (transverse), Yo (longitudinal) and Zo (vertical). Reference Φ denotes the elevation angle between the ascent axis Ze of the detection head 22 and the line of sight ZC of the detection zone ZV of an optical flow sensor 28. Preferably, the elevation angle Φ is approximately 23°, and the detection zone ZV covers approximately 24° times 12°.

The vector V represents the instantaneous linear speed of the microdrone 2. Ψ is the angle between the vector V and the speed of advance Xe of the detection head 22. Reference Vx denotes the component of the linear speed V along the axis of advance Xe, Vy denotes the component of the linear speed V along the drift axis Ye, and Vz denotes the component of the linear speed V along the ascent axis Ze.

The angle α is the angle between the local slope P of the terrain T flown over by the microdrone 2 and the horizontal Xo-Yo of the land reference R.

The distance Dsurface is the distance between the surface S of the terrain T and the center E of the detection head 22 along the normal N to the slope P of the terrain T.

The angle $\theta_{pitch}$ is the angle between the longitudinal axis X-X of the microdrone 2 and the horizontal Xo-Yo of the land plane of reference R.

The angle $\theta_{head}$ is the angle between the axis of advance Xe of the detection head 22 and the horizontal Xo-Yo of the land reference R.

The angle $\theta_{EiR}$ is the angle between the longitudinal axis X-X of the microdrone 2 and the angle of advance Xe of the detection head 22.

The angle $\theta_{head/slope}$ is the angle between the axis of advance Xe of the detection head 22 and the local slope P of the terrain T.

Figure 3:
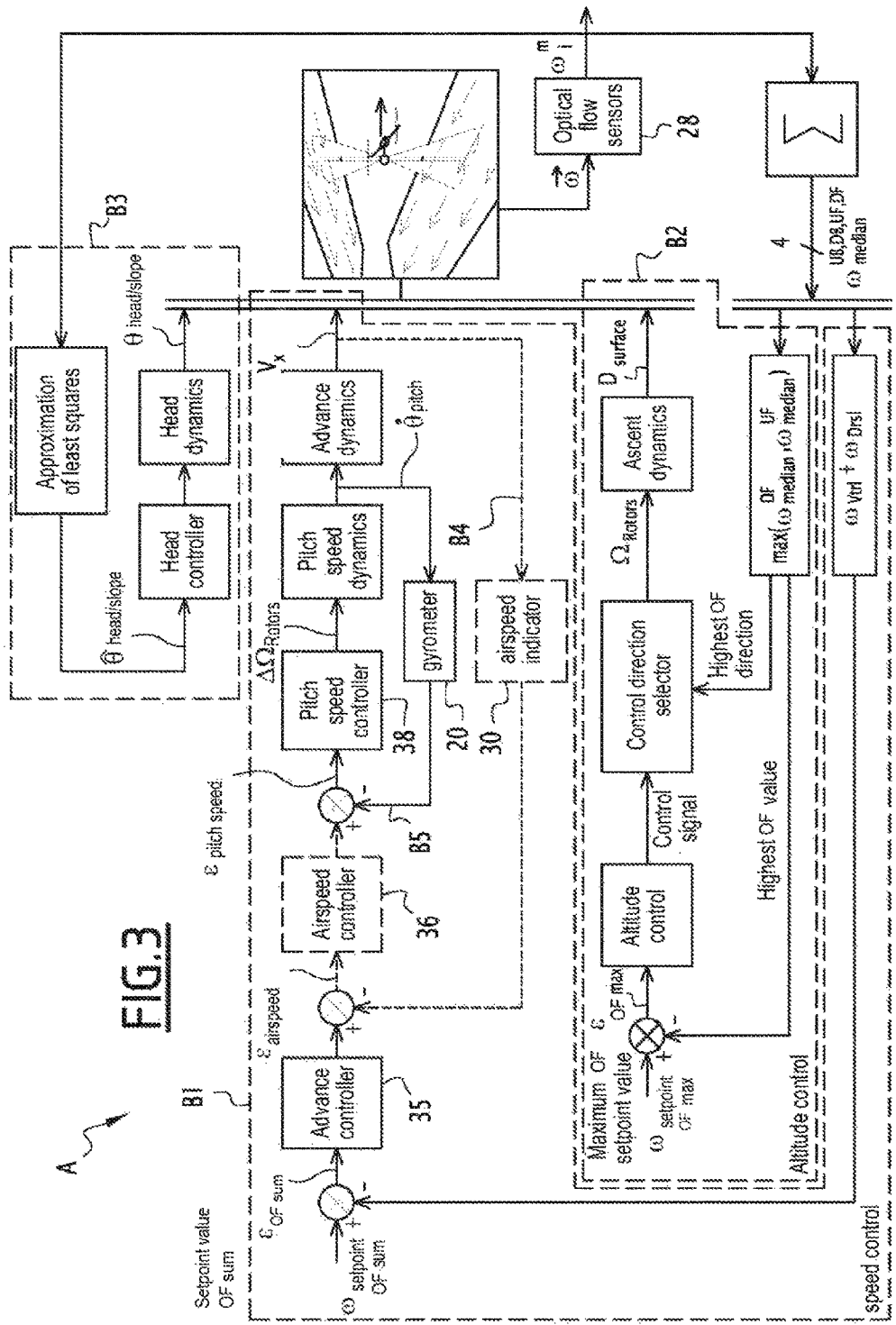
FIG. 3 illustrates the three feedback loops according to the invention respectively controlling the linear speed of advance and the altitude of the microdrone, and the orientation of the terrain detection head of the microdrone.

FIG. 3 shows a block diagram of the navigation algorithm A according to the invention installed in the microcontroller 26. The algorithm A comprises:
 a feedback loop B1 of the linear speed of advance Vx of the microdrone 2,
 a feedback loop B2 of the altitude of the microdrone 2, i.e., feedback of the distance Dsurface of the microdrone 2 from the terrain T, and
 a feedback loop B3 of the orientation of the detection zones Zv of the optical flow sensors 28.

Each feedback loop B1, B2, B3 is delimited by dotted lines.

The feedback loop B2 according to the invention is identical to the corresponding feedback loop described in the IROS article. For a detailed explanation of this feedback loop, reference is made to this article, the corresponding content of which is incorporated into the present description.

The feedback loop B1 according to the invention is comparable to the corresponding feedback loop described in the IROS article. It in particular also contains an advance controller 35. For a detailed explanation of the identical elements of these two feedback loops, reference is made to this article, the corresponding content of which is incorporated into the present description.

Compared to the feedback loop of the linear speed of advance known from the IROS article, the feedback loop B1 according to the invention further takes into account the measurements from the airspeed indicator 30 and from the gyrometer 20 using two additional feedback loops B4 and B5 interleaved in feedback loop B1 and respectively using an airspeed controller 36 and a pitch speed controller 38.

The loops B1, B4 and B5 cooperate as follows:

The advance controller 35 generates an airspeed setpoint value based on the result of the comparison between the sum of the measured ventral and dorsal optical flows $\omega_{vtrl}+\omega_{drsl}$ (with $\omega_{vtrl}$ proportional to $(\omega_{va}+\omega_{vd})$ and $\omega_{drsl}$ proportional to $(\omega_{da}+\omega_{dd})$) and a setpoint value $\omega_{setpoint\ sum\ FO}$. The airspeed setpoint value is next compared to the airspeed measured by the airspeed indicator 30. As a result of this comparison, the airspeed controller 36 generates a setpoint value of the pitch speed of the microdrone 2. The pitch speed setpoint value is next compared to the pitch speed measured by the gyrometer 20. Based on the result of this comparison, the pitch speed controller 38 determines the difference in thrust between the two rotors $\Delta\Omega_{rotors}$ that is necessary to obtain the desired linear speed of advance.

We will now describe the new feedback loop B3 of the orientation of the detection zones ZV of the optical flow sensors 28.

The basic idea of this feedback loop B3 is illustrated by FIGS. 4a) and 4b). FIGS. 4a), 4b) show a microdrone 2 flying over a terrain T with a slope P with angle α ending in a discontinuity u. One can also see the detection zones ZV of the ventral optical flow sensors.

In FIG. 4b), the detection head 22 of the microdrone 2 is stationary relative to the main body 12, such that the axis of advance Xe of the detection head 22 is still parallel to the longitudinal axis X-X of the main body 12. One can see that when flying over the slope P, the detection zones ZV of the optical flow sensors are oriented toward the rear relative to the terrain T compared to flying over flat terrain. Consequently, the microdrone 2 detects the discontinuity u late in position Xnr.

The applicant has discovered that the detection of discontinuities in the terrain and thus the navigation of the microdrone 2 is substantially improved by rotating the detection head 22, and thus the detection zones ZV of the optical flow sensors, as a function of the direction, in the local plane of reference L, of the maximum optical flow detected by the optical flow sensors. Indeed, the maximum optical flow direction corresponds, in particular in the presence of the feedback loop B2 leading the microdrone 2 to follow the terrain T, to the direction in which the distance between the center E of the detection head 22 and the surface S of the terrain T is minimal. In other words, the maximum optical flow direction M coincides with the direction of the normal N to the surface S of the terrain T passing through the center E of the detection head 22. One could also say that the maximum optical flow direction is the direction in which one "looks" right on the surface S of the terrain T being flown over.

The maximum optical flow direction M is subsequently identified in the local plane of reference L by the angle $\hat{\theta}_{head/slope}$ that it supports with the axis of ascent Ze.

According to the invention, the detection head 22 is rotated using the motor 32 such that the line of sight ZC of the detection zone ZV of the front ventral sensor 28.1 is separated by a determined reorientation angle γ from the maximum optical flow direction M. The reorientation angle γ is set such that the front control sensor 28.1 "looks" forward enough when the microdrone 2 follows a terrain T. Preferably, the reorientation angle γ is comprised between 0° and 90°, and particularly preferably, the reorientation angle γ is substantially equal to 23°.

It is advantageous to choose the elevation angle Φ (i.e., the fixed angle between the axis of ascent Ze of the detection head 22 and the line of sight ZC of the detection zone ZV of the ventral optical flow sensor 28.1) for the reorientation angle γ. Indeed, in this case, the feedback loop B3 keeps the axis of advance Xe of the detection head 22 parallel to the local slope P of a terrain T flown over by the microdrone 2.

FIG. 4a) shows the microdrone 2 with the feedback loop B3 in action, i.e., when the detection head 22 is closed-loop controlled in rotation around the drift axis Ye so as to respect the reorientation angle γ that is set at the value of the angle of elevation Φ. One can see that the detection zone ZV of the front ventral optical flow sensor 28.1 is straightened relative to FIG. 4b). Thus, the discontinuity u is detected earlier by the microdrone 2 in position Xr.

FIGS. 4c) and 4d) show the function $\omega/\omega_{max}=f(\Phi)$, i.e., the dependence of the relative optical flow $\omega/\omega_{max}$ of the angle Φ with respect to the axis of ascent Ze. FIG. 4c) shows f(Φ) for the case shown in FIG. 4a), and FIG. 4d) shows f(Φ) for the case shown in FIG. 4b). In each graph 4c) and 4d), the measurement points pma of the five local movement sensors of the front ventral optical flow sensor 28.1 and the measurement points pmd of the five local movement sensors of the rear ventral optical flow sensor 28.2 have been indicated.

Mathematical Foundation

We will now outline the mathematical foundation of the feedback loop B3 according to the invention.

According to the article "Blur zone" by T. Whiteside et al., published in the scientific review Nature, 225: 94-95, it is known that the optical flow ω varies with the orientation Φ of each optical flow sensor 28 relative to the local plane of reference L of the detection head 22 according to the following equation:

$$\omega(\Phi) = \frac{\|\vec{V}\|}{D(\Phi)} \times \sin(90 - \Phi - \Psi) \quad \text{Equation 1}$$

Assuming that the optical flow sensor 28 is oriented downward, it is possible to geometrically demonstrate that the distance D(Φ) depends on the angle α of the slope P of the terrain T flown over, the distance Dsurface, the angle $\theta_{head/slope}$, and the angle of elevation Φ:

$$D(\Phi) = D_{surface} \times \frac{\cos(\alpha)}{\cos(\Phi + \theta_{head/slope})} \quad \text{Equation 2}$$

Using equations 1 and 2, one deduces:

$$\omega(\Phi) = \frac{\|\vec{V}\|}{D_{surface} \times \cos(\alpha)} \times \cos(\Phi + \Psi) \times \cos(\Phi + \theta_{head/slope}) \quad \text{Equation 3}$$

Since we are looking for the direction of the maximum optical flow in order to determine $\theta_{head/slope}$, we differentiate equation 3:

$$\frac{d\omega(\Phi)}{d\Phi} = \frac{-\|\vec{V}\|}{D_{surface} \times \cos(\alpha)} \times [\sin(\Phi + \Psi) \times \cos(\Phi + \theta_{head/slope}) + \cos(\Phi + \Psi) \times \sin(\Phi + \theta_{head/slope})] \quad \text{Equation 4}$$

The maximum of the cosine function is then obtained for:

$$\frac{d\omega(\Phi)}{d\Phi} = 0 \Rightarrow \hat{\theta}_{head/slope} = -\frac{\Psi + \theta_{head/slope}}{2} \quad \text{Equation 5}$$

As can be seen in equation 5, when the microdrone 2 is in motion, the maximum of the optical flow does not appear when the detection head is parallel to the followed surface, but at an angle that depends on the angle $\theta_{head/slope}$ and the angle Ψ.

Hypothesis: the speed vector V is always parallel to the surface followed:

$$\Psi = \theta_{head/slope} \quad \text{Equation 6}$$

Indeed, the feedback loop B2 uses the optical flow measurements from the optical flow sensors 28 to maintain a constant ratio between the speed of advance of the microdrone 2 and the distance $D_{surface}$ from the surface S, which results in following of the terrain and the speed vector therefore aligns with the followed surface.

In this case, equation 5 becomes:

$$\hat{\theta}_{head/slope} = \theta_{head/slope} \quad \text{Equation 7}$$

The estimated reorientation angle $\hat{\theta}_{head/slope}$ can therefore be used to reorient the detection head 22 parallel to the followed surface because $\theta_{EiR} = \theta_{EiR} + \hat{\theta}_{head/slope}$ leads to $\theta_{head/slope} = 0$.

Near the position of the maximum optical flow, according to equation 3, the optical flow varies according to:

$$\omega(\Phi) \approx f(\Phi') = \frac{\|\vec{V}\|}{D_{surface} \times \cos(\alpha)} \times \cos^2(\Phi') \quad \text{Equation 8}$$

Consequently, the measurements should be taken for all of the optical flow sensors 28, which are all separated from one another by a known angle, and these measurements should be used to identify the angle $\theta_{head/slope}$.

One looks for the coefficients $$\frac{\|\vec{V}\|}{D_{surface} \times \cos(\alpha)} \text{ and } \hat{\theta}_{head/slope}$$

in the function:

$$f(\Phi') = \frac{\|\vec{V}\|}{D_{surface} \times \cos(\alpha)} \times \cos^2(\Phi' - \hat{\theta}_{head/slope})$$

which give the best approximation within the meaning of the least squares method from the optical flow measurements. This is implemented easily in the microcontroller 26 because it is possible to estimate the square cosine function by a second-degree polynomial function using a Taylor series expansion in the vicinity of 0:

$$f(\Phi') \approx \frac{\|\vec{V}\|}{D_{surface} \times \cos(\alpha)} \times (1 - (\Phi' - \hat{\theta}_{head/slope})^2) \approx$$
$$cst \times [-\Phi'^2 + 2 \times \hat{\theta}_{head/slope} \times \Phi' + (1 - \hat{\theta}_{head/slope}^2)]$$ Equation 9

This is equivalent to:

$$\omega(\Phi) \approx a \times \Phi'^2 + b \times \Phi' + c$$ Equation 10

$X = [(\Phi^2, \Phi', 1]$ is defined and, using the set of optical flow measurements $\Gamma$, the coefficients [a, b, c] are defined with the least squares method:

$$[a,b,c] = \text{inv}(X^*X')^*X^*\Gamma'$$ Equation 11

In this expression, only $\Gamma$ depends on the optical flow measurements, while the rest is constant and depends only on the fixed orientation of each optical flow measurement in the local plane of reference L.

A multiplication of matrices suffices to determine the coefficients [a; b; c], and afterwards, it is possible to use equations 9 and 10 to determine that the angle $\hat{\theta}_{head/slope}$ is the following:

$$\hat{\theta}_{head/slope} = -b/(2a)$$ Equation 12

During simulations, it was shown that with the noise added to the optical flow measurements, it is possible arrive at erroneous measurements of $\hat{\theta}_{head/slope}$, which creates oscillations of the detection head 22 during the feedback.

In order to eliminate the erroneous measurements, a "confidence index" is calculated:

$$\text{Confiance} = \frac{\sum_i |X' \times b - \omega_{\Phi_i}^{mes}|}{\text{median}(\omega_{\Phi_i}^{mes})}$$ Equation 13

A decrease in the confidence index corresponds to a higher similarity between the optical flow measurements and the approximate square cosine function. The angle $\hat{\theta}_{head/slope}$ is only validated if the confidence index is below a threshold.

Experimental Results

FIG. 5 shows an experiment done with two microdrones K1 and K2. The microdrone K1 was equipped with the feedback loop B3 according to the invention constantly reorienting its detection head 22 parallel to the ground, while the detection head 22 of the microdrone K2 is stationary relative to the main body 12.

The task of the two microdrones K1 and K2 was to navigate in a steep environment Q comprising a pointed relief H. It was noted that the microdrone K2 was detecting the pointed relief H late, and therefore crashing against it. However, using the detection zone reorientation method according to the invention, the microdrone K1 was managing to negotiate the pointed relief H. FIG. 5 shows the trajectories I1 (dotted lines) and I2 (solid line) of the microdrones K1 and K2.

Second Embodiment

FIG. 6 shows a second embodiment of the microdrone 2 according to the invention. Here, we are only interested in the differences relative to the first embodiment according to FIG. 1. For the elements shared by the two embodiments, reference is made to the description above.

In the second embodiment, the detection head 22 is attached to the main body 12 by a rod 40. No relative movement between the detection head 22 and the main body 12 is therefore possible. The detection head 22 is mounted on the main body 12 such that the axis of advance Xe is substantially parallel to the longitudinal axis X-X of the main body 12.

The optical flow sensor 28 here is made up of a matrix 42 of 84×15 photodetectors covering a detection field of substantially 360°×60° around the drift axis Ye. Among the multitude of photodetectors, a subset is chosen with four groups G1 to G4 that cover detection zones ZV similar to those of the first embodiment according to FIG. 1.

The feedback loop B3 is installed in this second microdrone so as to select different subsets of photodetectors in real-time to measure optical flows as a function of the estimated reorientation angle γ.

Preferred Alternatives of the Feedback Loop B3 of the Orientation of the Detection Zones ZV of the Sensors FIG. 7 shows an example of the feedback loop B3 as it is implemented in the microdrone 2 according to FIGS. 1 and 6. During a first step 101, the optical flow sensors 28 measure the optical flow ω in one or two dimensions (1D or 2D) in several detection zones ZV. During a second step 102, the microcontroller 26 estimates the direction of the perpendicular to the surface S flown over in the plane of reference L of the detection head 22. During a third step 103, the detection head 22 is reoriented so as to align its axis of advance Xe perpendicular to the perpendicular at the over-flown surface S. After the third step 103, the feedback loop B3 starts again with the first step 101, and so forth.

FIG. 8 shows an alternative of the feedback loop B3 using measurements from distance sensors instead of optical flow sensors.

The invention claimed is:

1. A surface identification device for the autonomous movement of a moving vehicle at a distance from that surface, the surface identification device comprising:
   a) a surface detection head defining a coordinate system fixed to the detection head with an origin at a center of the detection head, an axis of advance, a drift axis, an ascent axis, the detection head including at least one sensor for a quantity depending on the distance of the center of the detection head from the surface, each sensor covering a detection zone centered on a line of sight;
   b) an orientation system for orienting the detection zone of each sensor by rotating the detection zone around the drift axis; and
   c) a controller suitable for receiving and processing signals from each sensor and controlling the system for orienting the detection zone based on said signals, wherein the controller is configured for estimating the direction of the perpendicular to the surface in said coordinate system based on said signals, and for using said orientation system to rotate the line of sight of the viewing zone of each sensor into a direction separated by a determined reorientation angle from the direction of said perpendicular.

2. The device according to claim 1, wherein the reorientation angle is comprised between 0 and 90°.

3. The device according to claim 1, wherein each sensor is an optical flow sensor, and wherein the controller is configured for estimating the direction of the perpendicular to the surface by determining a maximum optical flow direction based on the signals delivered by each optical flow sensor.

4. The device according to claim 3, wherein the controller is configured for determining the maximum optical flow direction by carrying out the following steps:
   a) determining a function of the optical flow from the orientation of the line of sight of the detection zone in said coordinate system by regression analysis of the optical flow signals provided by each optical flow sensor; and
   b) determining the orientation of the line of sight of the detection zone for which said function has a maximum.

5. The device according to claim 4, wherein step a) is carried out using a least squares method.

6. The device according to claim 4, wherein step b) is carried out by differentiation of said function.

7. The device according to claim 1, wherein the controller is further configured for computing a confidence index based on said signals, and validating or rejecting the estimate of the direction of the perpendicular to the surface based on the value of the confidence index.

8. The device according to claim 1, wherein the detection head comprises four optical flow sensors, the four optical flow sensors being a front ventral sensor, a rear ventral sensor, a front dorsal sensor, and a rear dorsal sensor.

9. The device according to claim 1, wherein the detection zone orientation system comprises an actuator able to rotate the surface detection head around the drift axis.

10. The device according to claim 9, wherein the actuator is a stepping motor.

11. The device according to claim 1, provided with an optical flow measuring assembly comprising a matrix of photodetectors covering a detection field of substantially 360°×60° around the drift axis, and wherein the orientation system of the detection zone is able to select one or more subsets of said photodetectors to represent each of said sensors.

12. The device according to claim 1, wherein the detection head is further equipped with at least one gyro-stabilization sensor of the detection head to compensate the rotational movements of said moving vehicle during flight.

13. An aerial microdrone with autonomous movement comprising a device for the autonomous movement of a moving vehicle at a distance from that surface, the device comprising:
   a) a surface detection head defining a coordinate system fixed to the detection head with an origin at a center of the detection head, an axis of advance, a drift axis, an ascent axis, the detection head including at least one sensor for a quantity depending on the distance of the center of the detection head from the surface, each sensor covering a detection zone centered on a line of sight;
   b) an orientation system for orienting the detection zone of each sensor by rotating the detection zone around the drift axis; and
   c) a controller suitable for receiving and processing signals from each sensor and controlling the system for orienting the detection zone based on the signals, wherein the controller is configured for estimating the direction of a perpendicular to the surface in the coordinate system based on the signals, and for using the orientation system to rotate the line of sight of the viewing zone of each sensor into a direction separated by a determined reorientation angle from the direction of the perpendicular, wherein the detection zone orientation system comprises an actuator able to rotate the surface detection head around the drift axis, the controller being configured for controlling the actuator so as to align the axis of ascent of the detection head in the estimated direction of the perpendicular to the surface and thus to keep the axis of advance of the detection head parallel to the local slope of the surface overflown by the microdrone.

14. The microdrone according to claim 13, further comprising a gyrometer or an airspeed indicator or both for controlling the linear advance speed of the microdrone.

15. A surface identification method for the autonomous movement at a distance from said surface, the method comprising:
   defining a coordinate system fixed to a surface detection head of a device with an origin at a center of the surface detection head, an axis of advance, a drift axis, and an ascent axis;
   providing a detection zone centered on a line of sight of the at least one sensor;
   orienting an orientation system for the detection zone of the at least one sensor by rotating the detection zone around the drift axis;
   measuring a quantity of the at least one sensor depending on said distance from the surface in the provided detection zone;
   estimating with a controller of the device suitable for receiving and processing signals from the at least one sensor the direction of a perpendicular to the surface in the coordinate system based on the signals and thus the minimum distance direction from the surface based on the measured quantity; and
   reorienting with the controller the line of sight of the detection zone in a direction separated by a determined reorientation angle from the direction of said perpendicular.

16. The method according to claim 15, wherein the measuring step consists of measuring the optical flow, and the estimating step comprises:
   i) determining the function of the optical flow of the orientation of the line of sight of the detection zone by regression analysis of the optical flow measurements; and
   ii) determining the orientation of the line of sight of the detection zone for which said function has a maximum.

17. The method according to claim 16, wherein step i) is carried out using a least squares method.

18. The method according to claim 16, wherein step ii) is carried out by differentiation of said function.

19. The method according to claim 15,
   wherein the detection zone orientation system comprises an actuator able to rotate the surface detection head around the drift axis, the controller being configured for controlling the actuator so as to align the axis of ascent of the detection head in the estimated direction of the perpendicular to the surface and thus to keep the axis of advance of the detection head parallel to a local slope of the surface.

\* \* \* \* \*